(12) United States Patent
Doeppling et al.

(10) Patent No.: US 8,393,081 B2
(45) Date of Patent: Mar. 12, 2013

(54) METHOD FOR FILLING A BALL ROLLER BEARING WITH ROLL BODIES AS WELL AS A BALL ROLLER BEARING FILLED ACCORDING TO THE METHOD

(75) Inventors: Horst Doeppling, Schweinfurt (DE); Ernst Geiger, Hallerndorf (DE); Heinrich Hofmann, Schweinfurt (DE); Joachim Muser, Gunzenhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 443 days.

(21) Appl. No.: 12/809,346

(22) PCT Filed: Nov. 10, 2008

(86) PCT No.: PCT/EP2008/065203
§ 371 (c)(1),
(2), (4) Date: Jun. 29, 2010

(87) PCT Pub. No.: WO2009/083320
PCT Pub. Date: Jul. 9, 2009

(65) Prior Publication Data
US 2011/0007993 A1 Jan. 13, 2011

(30) Foreign Application Priority Data
Dec. 21, 2007 (DE) .......................... 10 2007 062 319

(51) Int. Cl.
*B21D 53/10* (2006.01)
(52) U.S. Cl. .................. 29/898; 29/898.04; 29/898.043; 29/898.07; 384/510; 384/512; 384/559; 384/560; 384/584

(58) Field of Classification Search ................ 29/898, 29/898.02–898.069; 384/510, 512, 559, 384/560, 584
See application file for complete search history.

(56) References Cited

U.S. PATENT DOCUMENTS

| 2,528,987 | A | * | 11/1950 | Albett | 384/570 |
| 2,682,435 | A | * | 6/1954 | Rien et al. | 384/562 |
| 3,938,632 | A | * | 2/1976 | Giese et al. | 192/41 A |
| 4,212,098 | A | * | 7/1980 | Sand | 29/460 |
| 5,293,688 | A | * | 3/1994 | Koch et al. | 29/898.041 |

FOREIGN PATENT DOCUMENTS

| DE | 151 483 | 1/1903 |
| DE | 168 499 | 2/1903 |
| DE | 24 07 477 | 8/1975 |
| DE | 43 34 195 | 3/1994 |
| DE | 10 2005 014 556 | 10/2006 |
| DE | 10 2005 061 792 A | 7/2007 |

* cited by examiner

*Primary Examiner* — Richard Chang
(74) *Attorney, Agent, or Firm* — Lucas & Mercanti, LLP; Klaus P. Stoffel (57) ABSTRACT

A method for filling a ball roller bearing with roll bodies, and a ball roller bearing, which is filled according to the method and has an outer and an inner bearing ring and a plurality of ball rollers, which are arranged between these bearing rings and have two side surfaces, which are flattened symmetrically from a basic spherical shape, parallel to one another and held at uniform distances from one another by a bearing cage. The ball rollers roll in groove-shaped raceways recessed in the inner face of the outer bearing ring and the outer face of the inner bearing ring. The ball roller bearing is filled by an eccentric axial, tilting fitting of the ball rollers through the interval between the bearing rings in the form, that the filled ball roller bearing is filled to the extent of about 94% and has a service life of up to 253%.

6 Claims, 8 Drawing Sheets

METHOD FOR FILLING A BALL ROLLER BEARING WITH ROLL BODIES AS WELL AS A BALL ROLLER BEARING FILLED ACCORDING TO THE METHOD

This application is a 371 of PCT/EP2008/065203 filed Nov. 10, 2008, which in turn claims the priority of DE 10 2007 062 319.6 filed Dec. 21, 2007, the priority of both applications is hereby claimed and both applications are incorporated by reference herein.

FIELD OF THE INVENTION

The invention relates to a method for filling a ball roller bearing having the features of the preamble part of claim 1 with rolling elements, and to a ball roller bearing filled by the method, which can be used to particular advantage, for example, as a fixed bearing for the drive and output shafts of a motor vehicle manual transmission.

BACKGROUND OF THE INVENTION

In rolling bearing technology it is commonly known that deep-groove ball bearings are rigid, permanently assembled radial rolling bearings, which are distinguished by an equally high radial and axial load bearing capacity, and which by virtue of their low friction have the highest speed limits of all types of bearings. These deep-groove ball bearings substantially comprise an outer bearing ring and an inner bearing ring and a number of balls, which as rolling elements are arranged between the bearing rings and which roll on groove-shaped ball raceways recessed into the inside of the outer bearing ring and into the outside of the inner bearing ring, and are guided at uniform distances from one another by a bearing cage. Filling radial ball bearings with the balls is in this case performed by the eccentric assembly method disclosed by DE 168 499, in which the two bearing rings are arranged eccentrically in relation to one another and the resulting crescent-shaped free space between the bearing rings is filled with the balls. The size and number of the balls are in each case designed according to the size of the bearing, so that the inner bearing ring between the first and last ball can be brought into the position concentric to the outer bearing ring using the elasticity of the two bearing rings, so that the balls can finally be distributed at a uniform distance from one another on the pitch circle of the two ball raceways and the bearing cage can be inserted.

In practice it has proved, however, that limits are nevertheless placed on the load-bearing capacity of such deep-groove ball bearings, owing to the low maximum number of balls that can be fitted or the low maximum filling density of approximately 60%. In the past a plurality of solutions have therefore been proposed, such as an unclosed insertion aperture arranged in the opposing flanges of the outer and inner bearing ring according to DE 151 483, for example or a closable insertion aperture of similar design according to DE 24 07 477 A1, which by increasing the number of balls are intended to increase the filling density and hence the load-bearing capacity of deep-groove ball bearings. Both in the unclosed and in the closed embodiment, however, such insertion apertures have the disadvantage that due to their wedge-shaped opening into the raceways of the balls or due to burrs a "sticking" or jamming of the rolling elements can occur at this insertion aperture, so that in practice such solutions have failed to gain acceptance.

Another possible way of increasing the number of rolling elements on a radial rolling bearing has also been disclosed by DE 43 34 195 A1. In this radial rolling bearing, intrinsically embodied as a single-row, deep-groove ball bearing, however, the rolling elements are not formed by balls but by so-called ball rollers, which are designed with two lateral faces symmetrically flattened from a basic spherical shape and arranged parallel to one another. The width of these ball rollers between their lateral faces is here less than the distance between the inside of the outer bearing ring and the outside of the inner bearing ring, so that the bearing can be filled with the ball rollers by the so-called axial assembly method, in which the ball rollers can be introduced into the bearing horizontally, as it were, axially through the distance between the inner and the outer bearing ring. When the centre of the ball rollers is then situated on a level with the axis of the rolling element raceway, the ball disks are turned by 90°, so that they are able to roll in the rolling element raceways with their ball bearing surfaces.

Despite the possibility for inserting these specially designed ball rollers axially into the bearing, thereby allowing the radial rolling bearing to be filled with a large number of rolling elements, however, such a radial rolling bearing at most only represents a compromise in terms of the desired increase in the load-bearing capacity of the bearing. This is due to the fact that the ball rollers, owing to their capability for axial introduction into the bearing, can only be formed with a correspondingly small width between their lateral faces, in order that they may be readily introduced into the bearing through the distance between the inner and the outer bearing ring. The rolling element raceways in the bearing rings can likewise be only of relatively shallow and narrow design, so as to be able to turn the rolling elements into their operating position without producing excessive radial play throughout the bearing in this operating position. However, the relatively narrow ball rollers and the shallow rolling element raceways give rise to a relatively small contact area of the ball rollers with their rolling element raceways, so that both the axial and the radial load-bearing capacity of such a radial bearing is again reduced and the original advantage of the increased number of rolling elements is almost entirely offset.

In order to avoid these disadvantages it has therefore been proposed by DE 10 2005 014 556 A1 to increase the width of the ball rollers between their lateral faces to at least 70% of the diameter of their basic spherical shape and to form the grooved raceways in the bearing rings with a depth of approximately 19% and a width of approximately 75% of the diameter of the basic spherical shape of the ball rollers, since this gives rise to an overall contact area of the ball rollers with their raceways amounting to approximately 45% of the circumference of the basic spherical shape of the ball rollers, as the balls of conventional deep-groove ball bearings with regard to their raceways in the bearing rings also exhibit. Since the distance between the outside of the inner bearing ring and the inside of the outer bearing ring is thereby reduced to approximately 60% of the diameter of the basic spherical shape of the ball rollers, however, and is therefore less than the width of the ball rollers, their insertion into the radial rolling bearing has again been accomplished by the eccentric assembly method, in which the ball rollers, with their lateral faces adjacent to one another are inserted obliquely into the raceways, into the free space between the two bearing rings, arranged eccentrically in relation to one another, before bringing the inner bearing ring into the position concentric with the outer bearing ring and finally distributing the ball rollers with a uniform distance between them on the pitch circle of their raceways and swivelling them by 90°. The flattened lateral faces of the ball rollers here mean that even with the eccentric assembly method it is possible to insert a greater number of rolling elements into the ball roller bearing compared to single-row, deep-groove ball bearings, giving a filling density of 73%.

Although a ball roller bearing of such a design has proved successful in giving the ball rollers large contact areas with their raceways in the bearing rings, in a manner similar to the balls of a deep-groove ball bearing, and allowing the ball roller bearing to be fitted with greater number of rolling elements or a higher filling density than conventional single-row, deep-groove ball bearings, the eccentric assembly method nevertheless means that some reductions in the number of rolling elements nevertheless have to be made compared to the greater number of rolling elements feasible in the axial assembly method. Although it has therefore been possible to reduce the overall axial installation space and the weight of the ball roller bearing compared to conventional deep-groove ball bearings and to increase its axial load-bearing capacity, the increase in the radial load-bearing capacity of the ball roller bearing nevertheless proved to be comparatively slight.

OBJECT OF THE INVENTION

Proceeding from the described disadvantages of the solutions of the known prior art, the object of the invention is therefore to devise a method for filling a ball roller bearing with rolling elements, enabling a ball roller bearing designed with similar raceway dimensions to a comparable deep-groove ball bearing to be filled with a substantially greater number of ball rollers, so that a ball roller bearing filled according to this method is primarily distinguished by a greater radial load-bearing capacity and by a substantially increased service life.

DESCRIPTION OF THE INVENTION

According to the invention this object is achieved, in a ball roller bearing having the features of the preamble part of claim 1, by an axial-tilt eccentric assembly method of the ball rollers through the distance between the bearing rings, in which the inner bearing ring of the two bearing rings, arranged in a horizontal concentric position relative to one another, is arranged so that firstly it is slightly moveable radially along a bearing longitudinal central axis and secondly it is on an axially offset higher plane than the outer bearing ring, in order to create a distance between the bearing rings that is greater than the width of the ball rollers, and the insertion of the ball rollers is performed by the following steps:
a) radial displacement of the inner bearing ring into an eccentric limit position and feeding of the ball rollers with their lateral faces oriented towards the bearing rings to the site of the maximum distance between the bearing rings on the bearing longitudinal central axis intended as the insertion point;
b) successive introduction of the ball rollers, in a position slightly tilted towards the outer bearing ring, into the insertion point between the bearing rings until the free filling space remaining between the bearing rings is just approximately equal to the diameter of the basic spherical shape of an individual ball roller;
c) axial lowering of the inner bearing ring and simultaneous axial raising of the outer bearing ring into a position in which the bearing rings are located in a common plane and the ball rollers tilted into the raceways of the bearing rings are held between the raceways;
d) rotational acceleration of the outer bearing ring to a speed at which the ball rollers spontaneously right themselves under their own rotation and due to centrifugal force and assume a uniformly inclined position inside the raceways of the bearing rings;
e) arresting of the outer bearing ring and simultaneous axial lowering of the inner and outer bearing rings until the ball rollers are located in a horizontally level position in the raceways of the bearing rings;
f) uniform distribution of the inserted ball rollers on the pitch circle of the ball roller bearing and insertion of the bearing cage through the distance between the bearing rings with final greasing and optional sealing of the ball roller bearing.

Preferred developments and advantageous secondary conditions of the method according to the invention are described in the dependent claims.

Thus, according to claims 2 and 3 of the method according to the invention, a first ball roller is first introduced individually into the insertion point between the bearing rings and this ball roller then remains in the insertion point as insertion aid for the other ball rollers, in order to perform the further feed and introduction of the other ball rollers preferably in pairs. In introducing the other ball rollers in pairs, it has here proved particularly advantageous to press these into the distance between the bearing rings with their bearing surfaces on both sides sliding along on the bearing surface of the first ball roller, so that the ball rollers previously inserted are each evenly forced into the free filling space still remaining between the bearing rings. The advantage of further paired filling of the ball roller bearing here lies in a reduction of the assembly time and thereby of the assembly costs, although it might also possibly be advantageous in certain types of bearings, however, to also insert the other ball rollers individually into the ball roller bearing. In such cases it is advantageous to first introduce two ball rollers into the insertion point between the bearing rings and then to press all further ball rollers between the two ball rollers situated in the insertion point into the distance between the bearing rings with their bearing surface sliding along on the bearing surfaces of the two ball rollers situated in the insertion point, so that here too the ball rollers previously inserted are each evenly forced into the free filling space still remaining between the bearing rings.

According to claim 4 a further feature of the method according to the invention is that the travel of the radial displaceability of the inner bearing ring on the bearing longitudinal central axis and the height of the axial offset of the two bearing rings in relation to one another in each case amounts to approximately 25% of the width of the raceways of the ball roller bearing. The magnitude of these two parameters of the method has here proved sufficient for their interaction to ensure that from the insertion of the first ball roller to the insertion of the last ball roller the distance between the bearing rings is always greater than the width of the ball rollers, at least at the insertion point. Since for the creation of an distance between the bearing rings greater than the width of the ball rollers through which to insert the first ball roller it is basically already sufficient, however, to bring the inner bearing ring into its eccentric limit position simply by radial displacement without any axially offset arrangement relative to the outer bearing ring, it is also possible, as an alternative to this offset arrangement of the two bearing rings right from the beginning of the assembly process, to raise the inner bearing ring onto an axially higher plane only as the process of filling the ball roller bearing with ball rollers progresses.

Furthermore, according to claim 5, the method according to the invention is distinguished by the fact that the axially height-offset arrangement of the two bearing rings preferably occurs on a plane inclined towards the insertion point of the ball rollers. This is intended to ensure that, under gravitational force, all ball rollers already inserted in the distance between the bearing rings form a well-ordered, contiguous row and do not roll uncontrollably away or turn crossways into the free filling space under the shear force introduced when inserting further ball rollers. As an alternative to such an arrangement of both bearing rings on an inclined plane, it is also possible, however, to arrange the bearing rings on a level plane and to bring about the well-ordered contiguous arrangement of the inserted ball rollers in the distance between the bearing rings by the force of a spring, which in each case bears against the first two of the ball rollers forced into the free filling space and is removed again after the insertion of the last ball roller.

In a further appropriate development of the method according to the invention in claim 6 an annular support plane arranged between the bearing rings is used for temporarily holding the inserted ball rollers and for orienting them horizontally level in the distance between the bearing rings. This support plane is arranged in one plane with the lower edge of the raceway of the outer bearing ring and thereby ensures that the inserted ball rollers do not slip through between the bearing rings, but after initially sliding along on and out of the raceway of the inner bearing ring settle on this support plane, so that the ball rollers with their bearing surfaces automatically tilt into both raceways of the bearing rings and, as further ball rollers are inserted, in this position roll along on the support plane into the free filling space located on both sides of the insertion point. As the number of inserted ball rollers increases, the inner bearing ring is in the process gradually pushed back out of its initial eccentric limit position by the ball rollers, so that after insertion of the last ball roller the radial offset of the inner bearing ring is completely cancelled and the two bearing rings are again arranged concentrically with one another. This support plane has furthermore proved very helpful when, after the rotational acceleration of the outer bearing ring, both bearing rings are axially lowered, in order to move the inserted ball rollers into a horizontally level position in the raceways, since this support plane, due to the axial lowering of the bearing rings, then projects into the interior of the ball roller bearing in such a way that it forms a supporting surface for the ball rollers now resting on this with one lateral face, which serves to orient the ball rollers horizontally and to prevent any rotation of the ball rollers when subsequently inserting the bearing cage.

Finally the object of the invention is also achieved by a ball roller bearing filled by the method according to the invention according to claims 7 and 8, since said bearing is distinguished by such a high number of inserted ball rollers that with the ball rollers adjacent to one another the distance between a first ball roller and a last ball roller is just approximately equal to the diameter of the basic spherical shape of an individual ball roller. Starting from a filling density of approximately 60% for a deep-groove ball bearing of equivalent construction, the ball roller bearing thereby has a filling density of up to approximately 94%, which in turn means that it has been possible to substantially increase its radial load-bearing capacity, in particular, and its service life, starting from a service life of 100% for a deep-groove ball bearing of equivalent construction, is now up to 253%. The decisive advantage of a ball roller bearing filled by the method according to the invention over ball roller bearings known from the prior art, therefore, is that despite the deep raceways in the bearing rings, ensuring a high axial load-bearing capacity of the ball roller bearing, and despite an distance between the bearing rings which is thereby smaller than the width of the ball rollers, it has a filling density which was hitherto achievable only with ball roller bearings filled by the axial assembly method, in which the ball rollers are of substantially narrower design and roll on substantially shallower raceways, and in which the distance between the bearing rings is greater than the width of the ball rollers.

BRIEF DESCRIPTION OF THE DRAWINGS

The method according to the invention and a preferred embodiment of a ball roller bearing filled by this method will be explained in more detail below with reference to the drawings attached, in which.

DETAILED DESCRIPTION OF THE DRAWINGS

Figure 1:
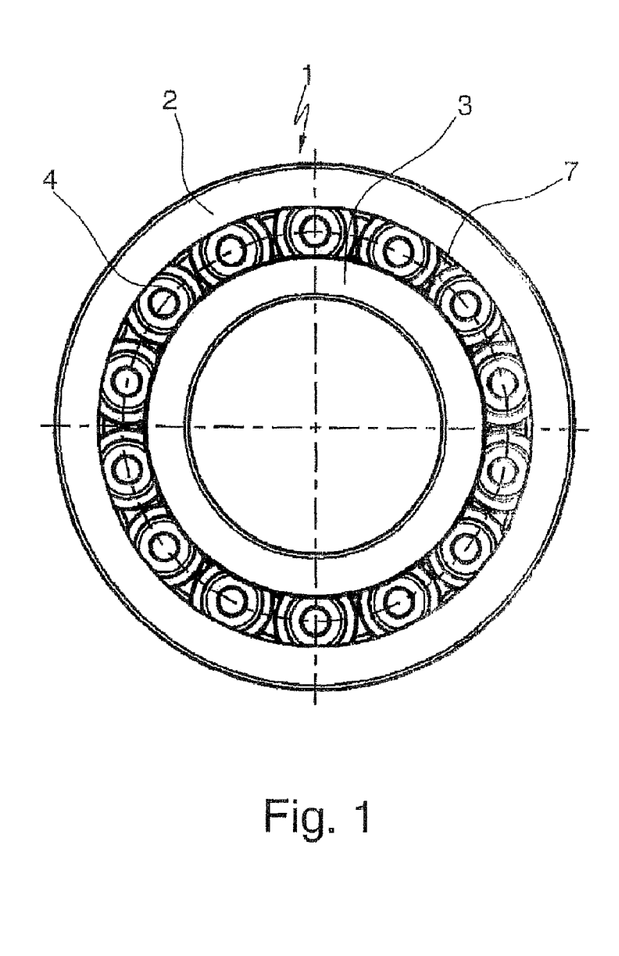
FIG. 1 shows an enlarged representation of a plan view of a ball roller bearing filled by the method according to the invention.
Figure 2:
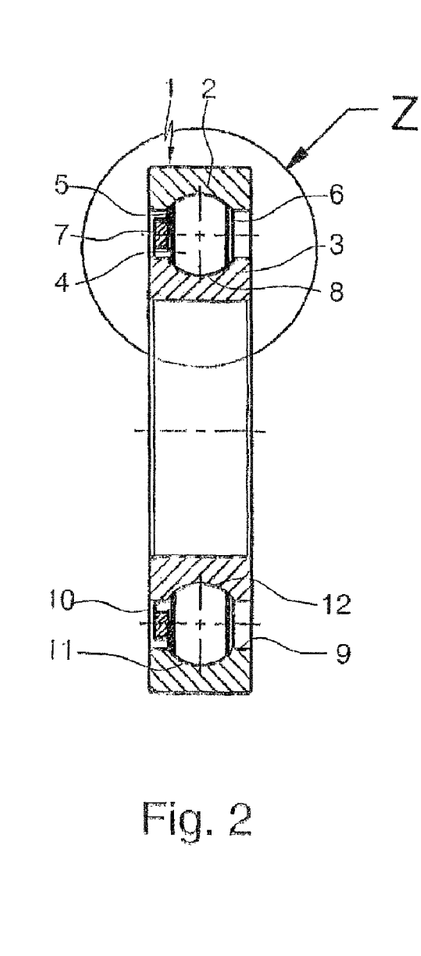
FIG. 2 shows the cross-section A-A through the ball roller bearing filled by the method according to the invention in FIG. 1.
Figure 3:
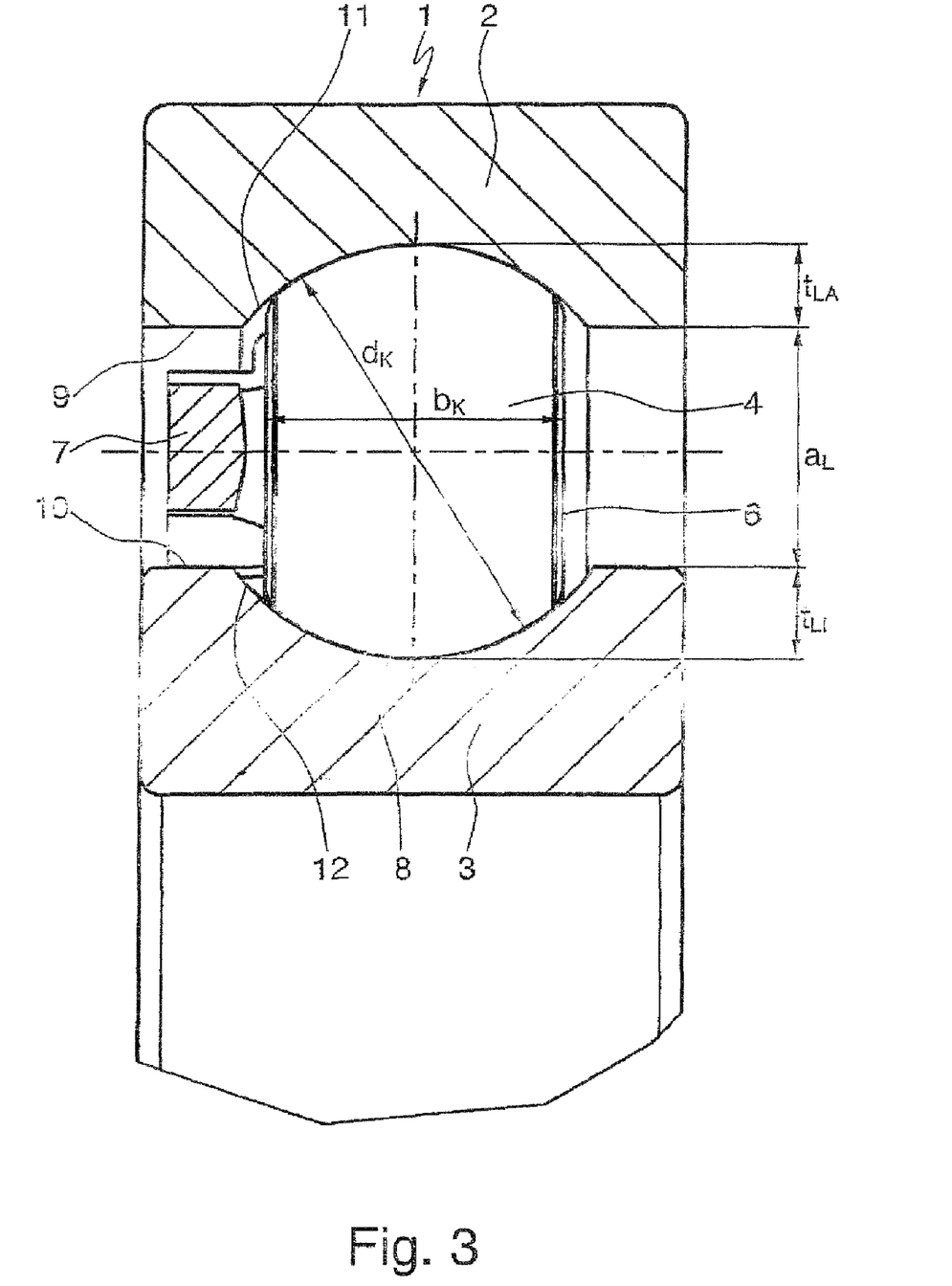
FIG. 3 shows an enlarged representation of the detail Z of the cross section through the ball roller bearing in FIG. 2.

FIGS. 1, 2 and 3 show different views of a single-row ball roller bearing 1, which substantially comprises an outer bearing ring 2 and an inner bearing ring 3 and a plurality of ball rollers 4, which are arranged in a row between these bearing rings 2, 3, and which each have two lateral faces 5, 6, symmetrically flattened from a basic spherical shape and arranged parallel to one another, and which are held at regular distances from one another in a circumferential direction by a bearing cage 7. FIG. 3 here clearly shows that between their lateral faces 5, 6 these ball rollers 4 have a width $b_K$ of approximately 70% of the diameter $d_K$ of their basic spherical shape and with their bearing surfaces 8 roll in two groove-shaped raceways 11, 12 recessed into the inside 9 of the outer bearing ring 2 and into the outside 10 of the inner bearing ring 3, the depth $t_{LA}$, $t_{LI}$ of which is designed with approximately 20% of the diameter $d_K$ of the basic spherical shape of the ball rollers 4, thereby ensuring a high axial load-bearing capacity of the ball roller bearing 1 adequate for a deep-groove ball bearing of equivalent construction. Owing to the deep design of the raceways 11, 12, the distance $a_L$ between the inside 9 of the outer bearing ring 2 and the outside 10 of the inner bearing ring 3 therefore amounts to just approximately 60% of the diameter $d_K$ of the basic spherical shape of the ball rollers 4, and is thereby less than the width $b_K$ of the ball rollers 4.

The essential innovation of the ball roller bearing 1 shown resides in the fact that, as can be seen from FIG. 1, it has such a high number of ball rollers 4 compared to deep-groove ball bearings or other known ball roller bearings that with the ball rollers 4 arranged adjacent to one another, the distance between a first ball roller 4 and a last ball roller 4 is smaller than the diameter $d_K$ of the basic spherical shape of an individual ball roller 4. Starting from a filling density of approximately 60% for a deep-groove ball bearing of equivalent construction, this ball roller bearing therefore has a filling density of approximately 94%, so that its radial load-bearing capacity is multiple times greater and its service life, starting from a service life of 100% for a deep-groove ball bearing of equivalent construction, is calculated to be approximately 253%.

Figure 4:
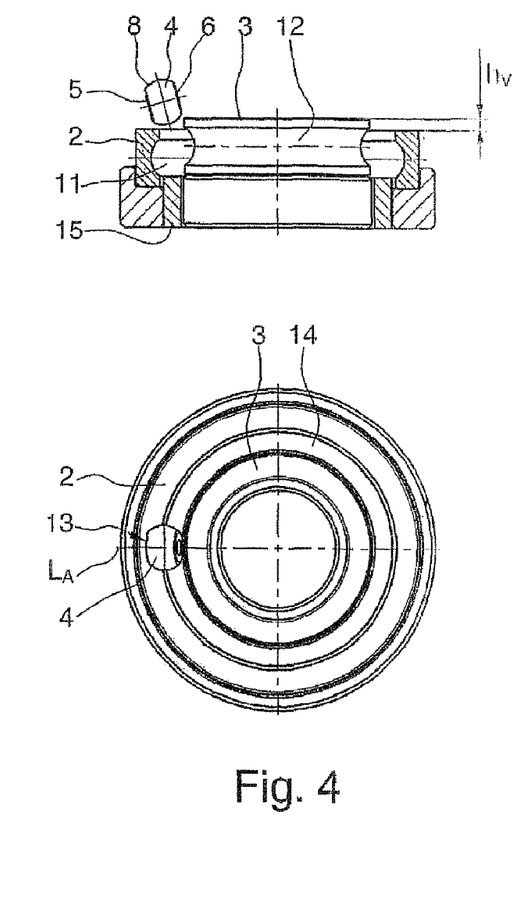
FIG. 4 shows a cross-section and a top view of the ball roller bearing during the first step in the method for filling it.
Figure 5:
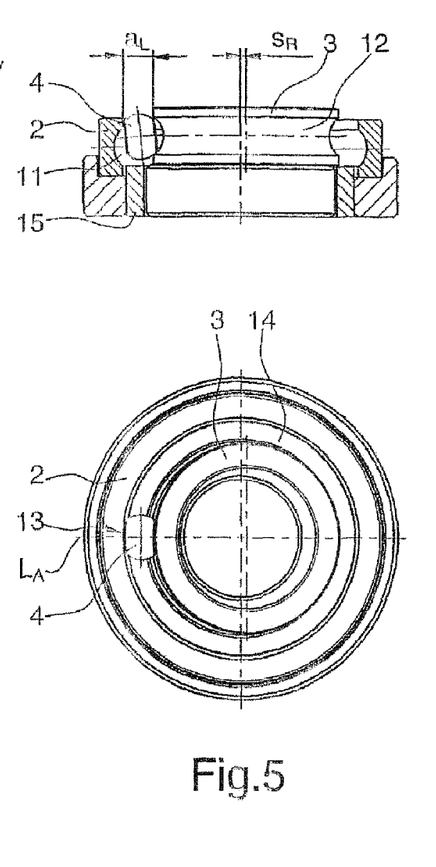
FIG. 5 shows a cross-section and a top view of the ball roller bearing during the second step in the method for filling it.

In FIGS. 4 to 14 the method for filling the ball roller bearing 1 with this high number of ball rollers 4 is also represented schematically. This method is embodied as an axial-tilt eccentric assembly method of the ball rollers 4 through the distance $a_L$ between the bearing rings 2, 3, in which, as shown in FIGS. 4 to 7, the inner bearing ring 3 of the two bearing rings 2, 3, arranged in a horizontal concentric position relative to one another, is for the time being arranged so that firstly it is slightly moveable radially along a bearing longitudinal central axis $L_A$ and secondly it is on an axially offset higher plane than the outer bearing ring 2, in order to create a distance $a_L$ between the bearing rings 2, 3 that is greater than the width $b_K$ of the ball rollers 4. The travel $s_r$ of the radial displaceability of the inner bearing ring 3 on the bearing longitudinal central axis $L_A$ and the height $h_V$ of the axial offset of the two bearing rings 2, 3 relative to one another is here, as indicated in FIG. 5, each approximately 25% of the width of the raceways 11, 12 of the bearing rings 2, 3 of the ball roller bearing 1, since this ensures that from the insertion of the first ball roller 4 to the insertion of the last ball roller 4 the distance $a_L$ between the bearing rings 2, 3 is always greater than the width of the $b_K$ ball rollers 4.

As shown in FIGS. 4 and 5, the mounting of the ball rollers 4 first begins by feeding a first ball roller 4, with its lateral faces 5, 6 oriented towards the bearing rings 2, 3, to the ball roller bearing 1, to the site of the maximum distance $a_L$ between the bearing rings 2, 3 on the bearing longitudinal central axis $L_A$ intended as insertion point 13, and radially displacing the inner bearing ring 3 by the amount $s_r$ into an eccentric limit position. The ball rollers 4, in an position slightly tilted towards the outer bearing ring 2, are then successively introduced into the insertion point 13 between the bearing rings 2, 3, until the free filling space 14 remaining between the bearing rings 2, is just approximately equal to the diameter $d_K$ of the basic spherical shape of an individual ball roller 4.

Figure 6:
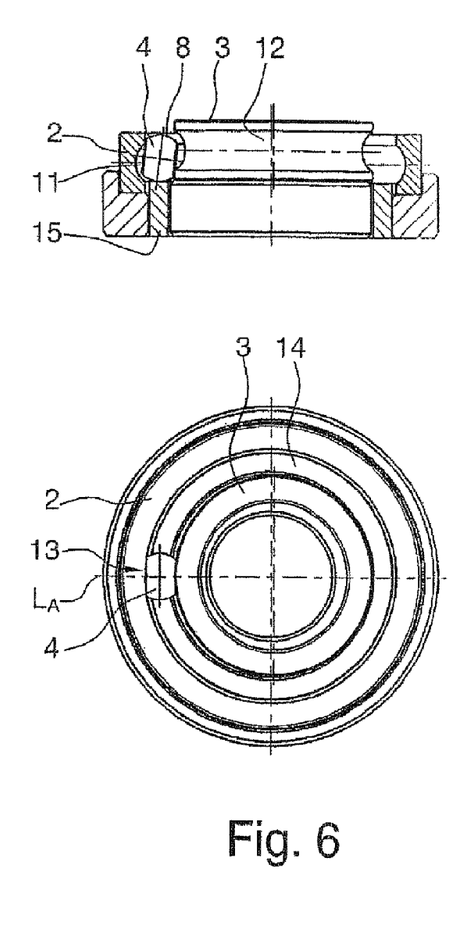
FIG. 6 shows a cross-section and a top view of the ball roller bearing to illustrate an intermediate position of the first inserted ball roller after the second step in the method.
Figure 7:
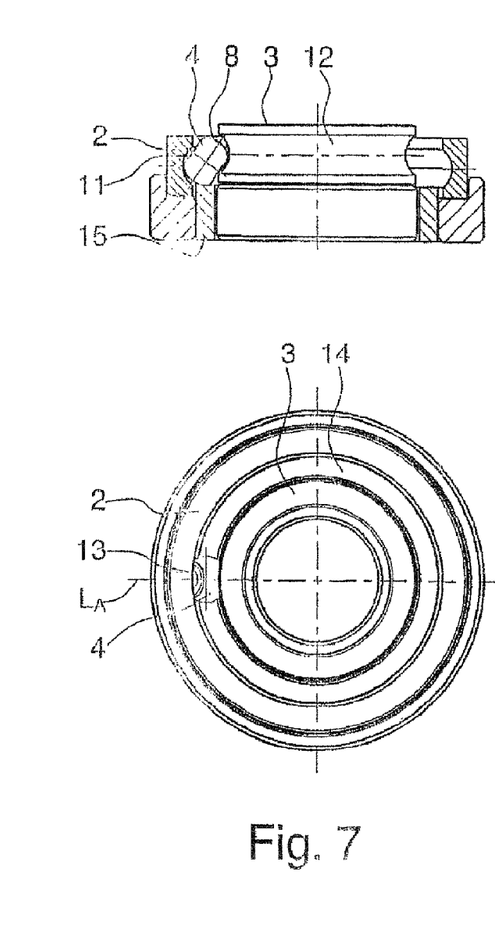
FIG. 7 shows a cross-section and a top view of the ball roller bearing to illustrate the ultimate position of the first inserted ball roller after the second step in the method.

For temporarily holding the inserted ball rollers 4 in the distance $a_L$ between the bearing rings 2, 3, use is made here of an annular support plane 15 arranged between the bearing rings 2, 3, which for the time being is arranged in one plane with the lower raceway edge of the outer bearing ring 2 and ensures that the inserted ball rollers 4, after initially sliding along on and out of the raceway 12 of the inner bearing ring 3, as indicated in FIGS. 5 and 6, settle on this support plane 15, in such a way that the ball rollers 4, as shown in FIG. 7, with their bearing surfaces 8 automatically tilt into both raceways 11, 12 of the bearing rings 2, 3 and, as further ball rollers 4 are inserted, in this position roll along on the support plane 15 into the free filling space 14 located on both sides of the insertion point 13.

Figure 8:
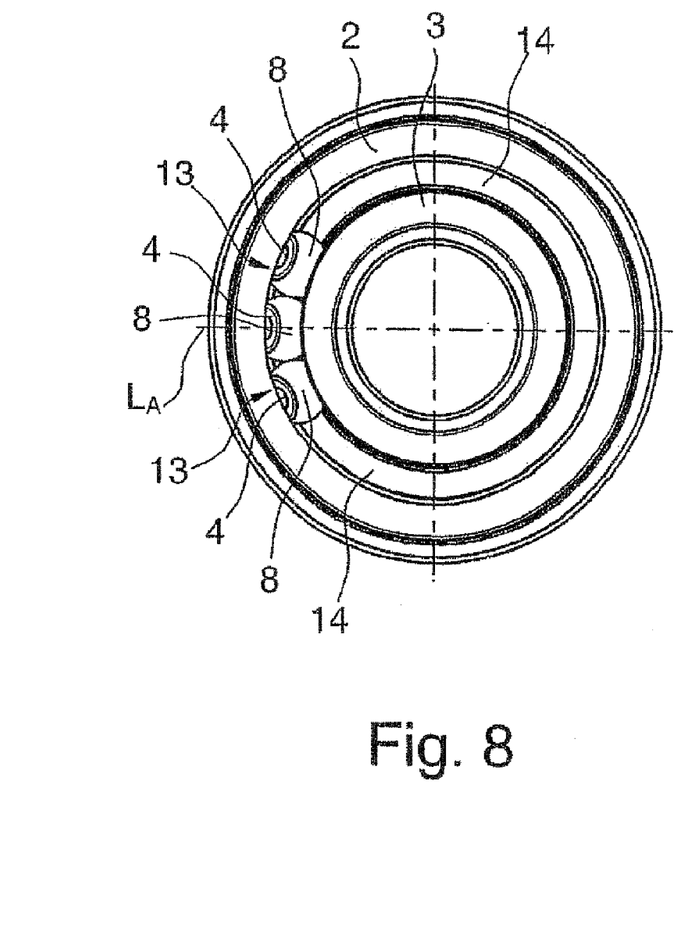
FIG. 8 shows a top view of the ball roller bearing to illustrate the ultimate position of three inserted ball rollers after the second step in the method.
Figure 9:
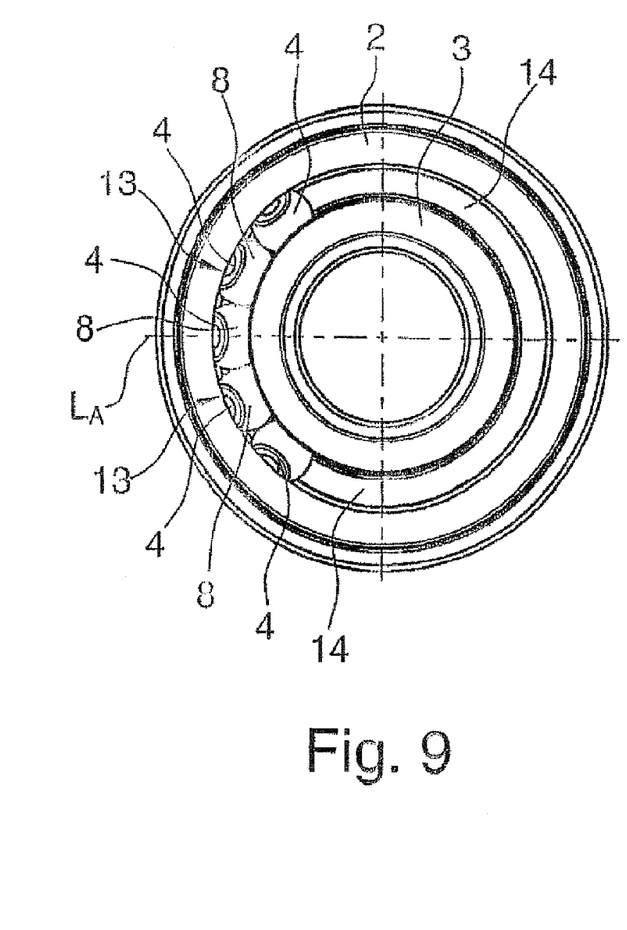
FIG. 9 shows a top view of the ball roller bearing to illustrate the ultimate position of five inserted ball rollers after the second step in the method.
Figure 10:
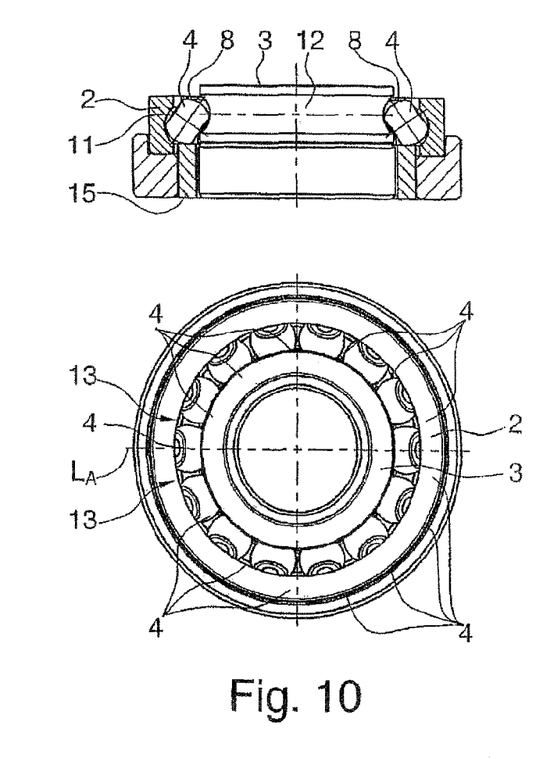
FIG. 10 shows a cross-section and a top view of the ball roller bearing to illustrate the ultimate position of all inserted ball rollers after the second step in the method.

FIGS. 8 and 9 furthermore clearly show that when inserting further ball rollers 4 the first ball roller 4 remains in the insertion point as insertion aid for the other ball rollers 4, in order to feed and introduce the other ball rollers 4, preferably in pairs. To do this, the other ball rollers 4, with their bearing surfaces 8 on both sides sliding along on the bearing surface 8 of the first ball roller 4, are pressed into the distance $a_L$ between the bearing rings 2, 3, so that the ball rollers 4 previously inserted at each are evenly forced into the free filling space 14 still remaining between the bearing rings 2, 3. In order that the ball rollers 4 already inserted in the distance $a_L$ between the bearing rings 2, 3 do not roll uncontrollably away or turn crossways into the free filling space 14 under the shear force introduced when inserting further ball rollers 4, the bearing rings 2, 3 are here arranged on a plane (not further represented in the drawings), which is inclined towards the insertion point 13 of the ball rollers 4, so that the ball rollers 4, under the gravitational force acting, form a well-ordered, contiguous row, as shown in FIGS. 8 and 9. As the number of inserted ball rollers 4 increases, the inner bearing ring 3, as is also apparent from FIGS. 8 and 9, is furthermore gradually pushed back out of its initial eccentric limit position by the ball rollers 4, so that after insertion of the last ball roller 4, as represented in FIGS. 10 and 11, the radial offset of the inner bearing ring 3 is completely cancelled and the two bearing rings 2, 3 are again arranged concentrically with one another.

Figure 11:
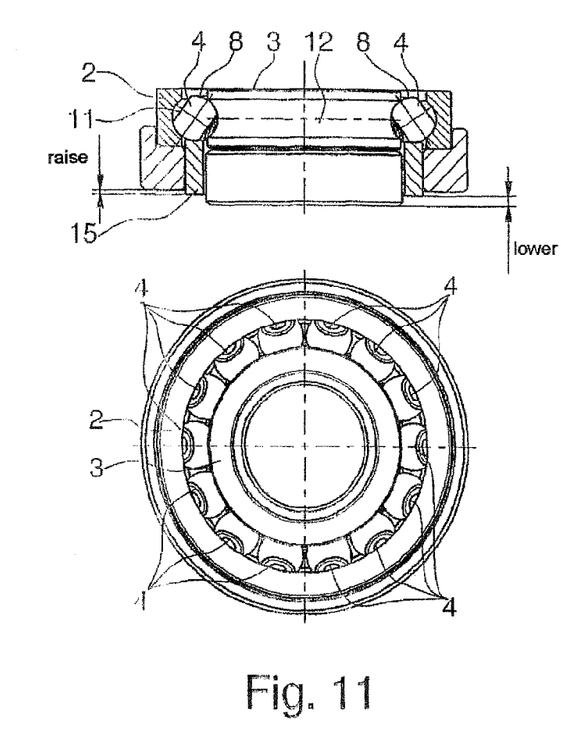
FIG. 11 shows a cross-section and a top view of the ball roller bearing during the third step in the method for filling it.
Figure 12:
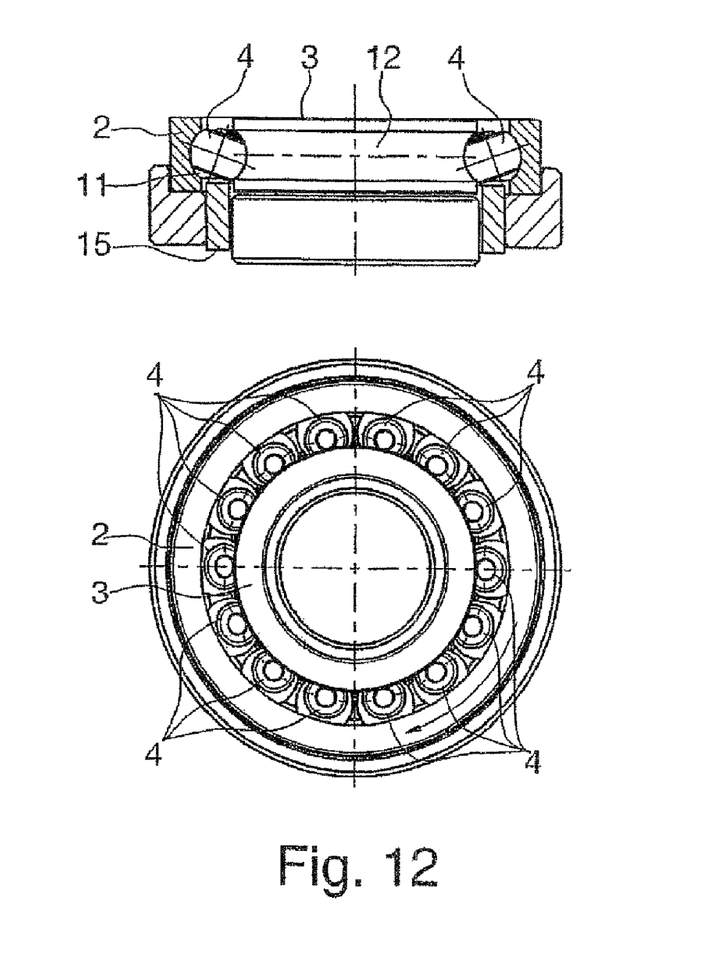
FIG. 12 shows a cross-section and a top view of the ball roller bearing during the fourth step in the method for filling it.

Once all the intended ball rollers 4 have been inserted into the ball roller bearing, the next step in the method is to axially lower the inner bearing ring 3 while at the same time axially raising the outer bearing ring 2, as represented in FIG. 11, so that the two bearing rings 2, 3 are arranged in a common plane and the ball rollers 4 tilted into the raceways 11, 12 of the bearing rings 2, 3 are held between the raceways 11, 12. In this position the outer bearing ring 2 is then rotationally accelerated to a speed at which the ball rollers 4 spontaneously right themselves under their own rotation and due to centrifugal force and assume a uniformly inclined position inside the raceways 11, 12 of the bearing rings 2, 3, according to the representation in FIG. 12.

Figure 13:
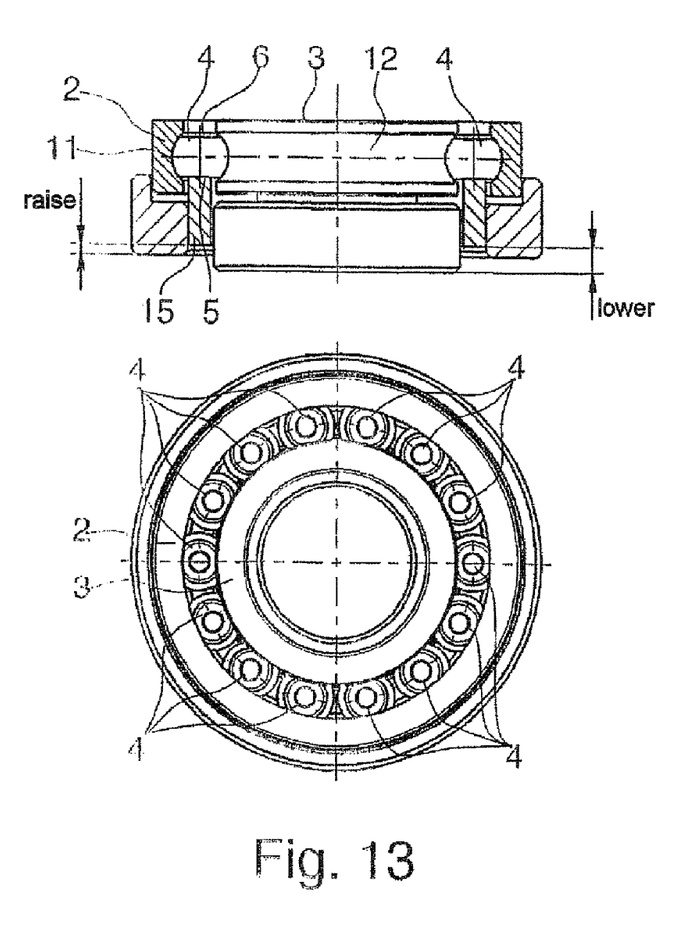
FIG. 13 shows a cross-section and a top view of the ball roller bearing during the fifth step in the method for filling it.
Figure 14:
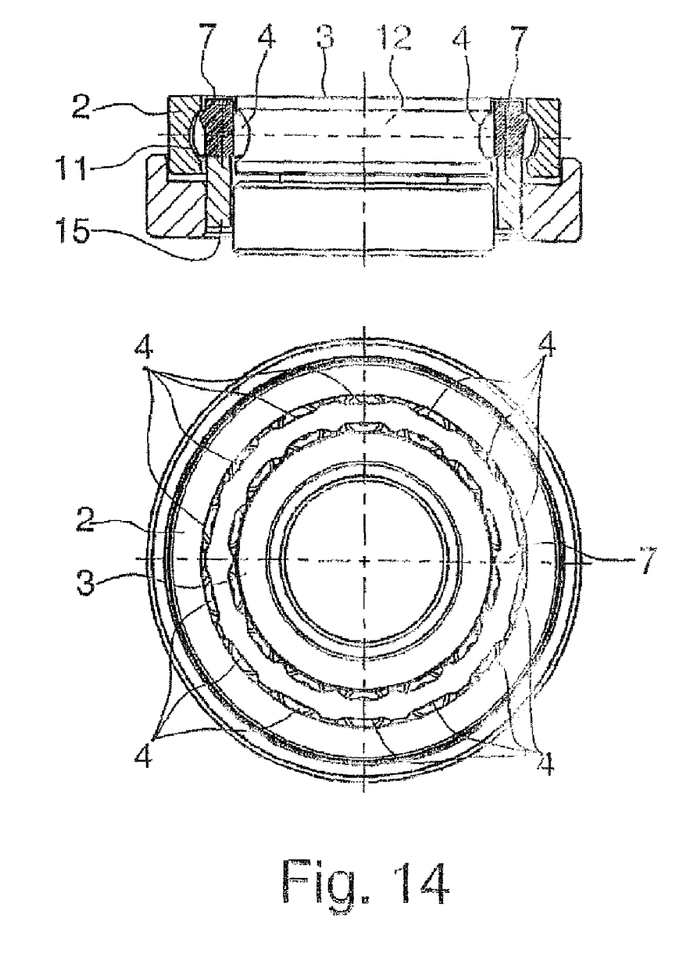
FIG. 14 shows a cross-section and a top view of the ball roller bearing during the final step in the method for filling it.

After arresting the outer bearing ring 2 a simultaneous axial lowering of the inner bearing ring 3 and of the outer bearing ring 2 then ensues until the ball rollers 4 are located in a horizontally level position in the raceways 11, 12 of the bearing rings 2, 3, as can be seen from FIG. 13. It can clearly be seen that the ball rollers 4 here are held in this horizontal position by the support plane 15 now projecting into the interior of the ball roller bearing 1, so that after a regular distribution of the inserted ball rollers 4 on the pitch circle of the ball roller bearing 1 the bearing cage 7 can be easily inserted through the distance $a_L$ between the bearing rings 2, 3, as shown in FIG. 15, and the ball roller bearing 1 can be finally greased and sealed.

LIST OF REFERENCE NUMERALS

1 Ball roller bearing
2 Outer bearing ring
3 Inner bearing ring

4 Ball rollers
5 Lateral face of 4
6 Lateral face of 4
7 Bearing cage
8 Bearing surfaces of 4
9 Inside of 2
10 Outside of 3
11 Raceway in 9
12 Raceway in 10
13 Insertion point
14 Filling space
15 Support plane
$b_K$ Width of 4
$t_{LA}$ Depth of 11
$t_{LI}$ Depth of 12
$d_{dK}$ Diameter of 4
$a_{aL}$ Distance between 2 and 3
$L_A$ Bearing longitudinal central axis
$s_r$ Travel of radial displaceability of 3
$h_v$ Height of axial offset between 2 and 3

The invention claimed is:

1. A method for filling a ball roller bearing with rolling elements, which ball roller bearing, comprising:
two bearing rings, the bearing rings being an outer bearing ring and an inner bearing ring; and
a plurality of ball rollers, which are arranged between the bearing rings and which each have two lateral faces, symmetrically flattened from a basic spherical shape and arranged parallel to one another, and which are held at uniform distances from one another in a circumferential direction by a bearing cage, the ball rollers, between the lateral faces, having a width of approximately 70% of a diameter of a basic spherical shape and bearing surfaces rolling in two groove-shaped raceways recessed into an inside of the outer bearing ring and into an outside of the inner bearing ring, a depth of which is designed to be approximately 20% of the diameter of the basic spherical shape of the ball rollers, while a distance between the inside of the outer bearing ring and the outside of the inner bearing ring amounts to just approximately 60% of the diameter of the basic spherical shape of the ball rollers,
wherein an axial-tilt eccentric assembly of the ball rollers through the distance between the bearing rings, in which the inner bearing ring of the two bearing rings, arranged in a horizontal concentric position relative to one another, is arranged so that firstly it is slightly moveable radially along a bearing longitudinal central axis and secondly it is on an axially offset higher plane than the outer bearing ring in order to create the distance between the bearing rings that is greater than a width of the ball rollers, comprising the following steps:
a) radially displacing of the inner bearing ring into an eccentric limit position and feeding of the ball rollers with the lateral faces oriented towards the bearing rings to a site of a maximum distance between the bearing rings on the bearing longitudinal central axis intended as an insertion point;
b) successively introducing of the ball rollers, in a position slightly tilted towards the outer bearing ring, into the insertion point between the bearing rings until a free filling space remaining between the bearing rings is just approximately equal to the diameter of the basic spherical shape of an individual ball roller;
c) axially lowering the inner bearing ring and simultaneous axially raising the outer bearing ring into a position in which the bearing rings are located in a common plane and the ball rollers tilted into the raceways of the bearing rings are held between the raceways;
d) rotationally accelerating the outer bearing ring to a speed at which the ball rollers spontaneously right themselves under rotation due to centrifugal force and assume a uniformly inclined position inside the raceways of the bearing rings;
e) arresting the outer bearing ring and simultaneously axially lowering the inner bearing ring and of the outer bearing ring until the ball rollers are located in a horizontally level position in the raceways of the bearing rings;
f) uniformly distributing of the inserted ball rollers on a pitch circle of the ball roller bearing and inserting the bearing cage through the distance between the bearing rings with final greasing and optional sealing of the ball roller bearing.

2. The method for filling a ball roller bearing according to claim 1, wherein a first ball roller is introduced individually into the insertion point between the bearing rings and the first ball roller then remains in the insertion point as insertion aid for the other ball rollers, in order to perform a further feed and introduction of the other ball rollers in pairs.

3. The method for filling a ball roller bearing according to claim 2, wherein in introducing the remaining ball rollers in pairs the ball rollers are pressed into the distance between the bearing rings with the bearing surfaces on both sides sliding along on one of the bearing surfaces of the first ball roller and force the ball rollers previously inserted in each case into the free filling space still remaining between the bearing rings.

4. The method for filling a ball roller bearing according to claim 1, wherein a travel of a radial displaceability of the inner bearing ring on the bearing longitudinal central axis and the height of the axial offset of the two bearing rings in relation to one another in each case amounts to approximately 25% of a width of the raceways of the ball roller bearing.

5. The method for filling a ball roller bearing according to claim 1, wherein the axially height-offset arrangement of the bearing rings occurs on a plane inclined towards the insertion point of the ball rollers, in order for gravitational force to produce a well-ordered contiguous arrangement of the ball rollers which are inserted in the distance between the bearing rings.

6. The method for filling a ball roller bearing according to claim 1, wherein an annular support plane, which is arranged between the bearing rings and which is located in one plane with a lower edge of the raceway of the outer bearing ring, is used for temporarily holding the ball rollers which are inserted and for orienting the ball rollers horizontally level in the distance between the bearing rings.

* * * * *

UNITED STATES PATENT AND TRADEMARK OFFICE
CERTIFICATE OF CORRECTION

PATENT NO. : 8,393,081 B2  Page 1 of 1
APPLICATION NO. : 12/809346
DATED : March 12, 2013
INVENTOR(S) : Doeppling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 451 days.

Signed and Sealed this
First Day of September, 2015

Michelle K. Lee
*Director of the United States Patent and Trademark Office*